United States Patent [19]

Najjar et al.

[11] Patent Number: 5,160,352
[45] Date of Patent: Nov. 3, 1992

[54] METHOD OF FORMING MEMBRANES USEFUL FOR SEPARATION OF GASES

[75] Inventors: Mitri S. Najjar, Wappingers Falls; Martin D. Hilmar, Beacon, both of N.Y.

[73] Assignee: Texaco Inc., White Plains, N.Y.

[21] Appl. No.: 755,898

[22] Filed: Sep. 6, 1991

[51] Int. Cl.⁵ .................... B01D 53/22; B01D 71/02
[52] U.S. Cl. ................................... 55/16; 55/68; 55/158; 55/524
[58] Field of Search .............. 55/16, 68, 158, 523, 55/524

[56] References Cited

U.S. PATENT DOCUMENTS

| | | | |
|---|---|---|---|
| 2,627,933 | 2/1953 | Teter | 55/158 |
| 4,085,048 | 4/1978 | Croset et al. | 55/158 X |
| 4,329,157 | 5/1982 | Dobo et al. | 55/158 X |
| 4,865,630 | 9/1989 | Abe | 55/158 |
| 4,971,696 | 11/1990 | Abe et al. | 55/158 X |

FOREIGN PATENT DOCUMENTS

| | | | |
|---|---|---|---|
| 2550953 | 3/1985 | France | 55/158 |
| 59-059223 | 4/1984 | Japan | 55/158 |
| 59-059224 | 4/1984 | Japan | 55/158 |
| 59-102403 | 6/1984 | Japan | 55/158 |
| 59-107988 | 6/1984 | Japan | 55/158 |
| 59-145007 | 8/1984 | Japan | 55/158 |
| 59-147605 | 8/1984 | Japan | 55/158 |
| 59-179112 | 10/1984 | Japan | 55/158 |
| 61-238303 | 10/1986 | Japan | 55/158 |
| 62-074938 | 6/1987 | Japan | 55/158 |
| 62-227421 | 10/1987 | Japan | 55/158 |
| 1-281119 | 11/1989 | Japan | 55/158 |
| 1-310714 | 12/1989 | Japan | 55/158 |
| 2-102723 | 4/1990 | Japan | 55/158 |

*Primary Examiner*—Robert Spitzer
*Attorney, Agent, or Firm*—Robert A. Kulason; James J. O'Loughlin; Carl G. Seutter

[57] ABSTRACT

A porous support layer is loaded with blocking liquid, such as an alcohol, prior to contact with an aluminum alkoxide to form thereon a layer of alumina which is dried and calcined to yield a membrane suitable for separation of gases.

12 Claims, No Drawings

METHOD OF FORMING MEMBRANES USEFUL FOR SEPARATION OF GASES

FIELD OF THE INVENTION

This invention relates to novel membranes and to the method of preparation of these membranes. More particularly it relates to a method of separating a charge mixture which contains several components to permit attainment of a product stream which is enriched with respect to one of the components.

BACKGROUND OF THE INVENTION

As is well known to those skilled in the art, it is possible to treat charge mixtures by various techniques in order to recover one (or more) components in enriched or in pure form. In the case of liquids, this may commonly be effected by distillation or adsorption. In the case of gases, it is possible to effect separation by absorption or adsorption or by distillation of the liquified gases.

Although prior art attempts to separate gases, such as mixtures of hydrogen and carbon dioxide, by use of membrane technology have been heretofore considered, they have not been successful for many reasons. Among these may be noted the failure of the membranes due to mechanical defects (e.g. cracking) or the attainment of undesirably low Separation Factors and/or Flux.

It has also been difficult-to-impossible to fabricate membranes to be used in these processes because the fabrication processes were slow, difficult to control, produced unsatisfactory membranes, or required undesirable reagents (e.g. large quantities of water).

Background relating to this invention may be obtained from the article *The Sol-Gel Process* by Larry L. Hench and Jon K. West Chem. Rev. (1990) 90 33–72, which is incorporated herein by reference.

It is an object of this invention to provide a method of forming a membrane of an oxide of aluminum characterized by its ability, when formed as a membrane, to separate components of charge streams. Other objects will be apparent to those skilled in the art.

STATEMENT OF THE INVENTION

In accordance with certain of its aspects, this invention is directed to a method of preparing a membrane assembly containing (i) a porous ceramic carrier layer characterized by mechanical strength and (ii) a surface layer which comprises loading the outer layers of macropores of a porous ceramic carrier with blocking liquid thereby forming a porous ceramic support layer bearing outer layers of macropores loaded with adsorbed blocking liquid;

contacting said outer layers of macropores of said porous ceramic carrier layer loaded with adsorbed blocking liquid with an aluminum alkoxide sol;

maintaining said outer layers of macropores of said porous carrier layer loaded with adsorbed blocking liquid in contact with said aluminum alkoxide sol for an adsorption period during which said alkoxide sol is adsorbed as a surface layer on the surface of said porous carrier layer;

drying said porous support layer bearing (i) outer layers of macropores loaded with adsorbed blocking liquid and (ii) a surface layer of said alkoxide sol during a controlled drying period during which said adsorbed blocking liquid migrates outwardly toward the surface of said porous ceramic carrier layer during drying and minimizes migration of said alkoxide sol into said porous ceramic carrier layer as drying continues thereby forming a dried porous ceramic carrier layer bearing a surface layer of dried alkoxide sol;

calcining said porous ceramic carrier layer bearing said surface layer of dried alkoxide sol at a calcining temperature of 400° C.–500° C. thereby decomposing said alkoxide and forming a porous carrier layer bearing a surface layer of decomposed alkoxide sol; and recovering said porous ceramic carrier layer bearing a surface layer of decomposed alkoxide sol.

DESCRIPTION OF THE INVENTION

The porous ceramic carrier layer substrate which may be used in practice of the process of this invention may be a permeable composition which is stable under the conditions of preparation and operation. The preferred substrates may be formed of alumina, silica, silica-alumina, zirconia, silica-zirconia, alumina-zirconia, titania, silica-titania, alumina-titania, etc. The preferred porous ceramic permeable carrier layer may be alumina, preferably alpha alumina, in the form of a disk or plate, cylinder or tube, etc. It is characterized by its stability and mechanical strength and by a macroporous structure.

In practice of the processes of this invention, a porous support layer is formed on the porous ceramic carrier layer.

The porous ceramic carrier layer is first contacted with a blocking liquid. The blocking liquid may be a liquid which is preferably characterized by a low viscosity (typically below 20 cp, say 3–2.1 cp) at 21° C.–32° C., say ambient temperature so that it may readily be loaded onto the ceramic porous support and enter into the macropores thereof. It is also characterized by a high surface tension-typically above 5, say 10–50 dynes per cm and thus readily wets the ceramic porous support. The boiling point of the blocking liquid is preferably below 100° C., say 40° C.–90° C. so that it may readily be volatilized during subsequent treatment.

Blocking liquid may be water, an alcohol, a ketone, an ester, an organic carboxylic acid, etc. Typical acids may include acetic acid, propionic acid etc. Typical esters may include methyl acetate, ethyl acetate, methyl propionate, etc. Typical ketones may include acetone, methyl ethyl ketone, diethyl ketone, etc. Typical alcohols may include methanol, ethanol, n-propanol, i-propanol, etc. The preferred blocking liquids may include lower, water-soluble alcohols typified by methanol; and they may typically be used as 10 w%–90 w%, say 45 w% aqueous solutions thereof.

Loading of the blocking liquid may typically be effected at 20° C.–80° C., say 65° C. and atmospheric pressure as by spraying the liquid onto the surface of the porous ceramic support—typically for 0.5–15 minutes, say 1.5 minutes. When the porous ceramic support is a tube, typically of length of 40–100 cm, say 75 cm and inside diameter of 7–12 mm, say 8.5 mm, the blocking liquid may be typically maintained inside the tube during the loading period.

At the end of the loading period, the excess blocking liquid is removed from the surface of the porous ceramic support layer as by washing (e.g. with water) or by drying at about 20° C.–100, say 26° C. for 20–60 minutes, say about 25 minutes. Preferably this is effected to yield a superficially dry surface.

On inspection (as by cutting out a section in a test piece), it is found that the blocking liquid has been adsorbed by and filled at least an outer layer of macropores of the ceramic carrier layer. Depending on the time of loading, the blocking liquid may fill pores throughout the entire body. Clearly longer times of loading will result in filling more pores.

The membrane layers of this invention may be formed on the porous ceramic support layer, bearing outer layers of macropores loaded with adsorbed blocking liquid, by use of a charge composition of aluminum alkoxide. Although it may be possible to prepare the novel membranes of this invention from a mono-alkoxide $Al(OR)X_2$ (wherein X represents another inert group) or from a dialkoxide $Al(OR)_2X$, it is preferred to utilize, as charge, a tri-alkoxide characterized by the formula $Al(OR)_3$.

In the above formula, R may be a hydrocarbon group selected from the group consisting of alkyl, aralkyl, cycloalkyl, aryl, and alkaryl including such radicals when inertly substituted. When R is alkyl, it may typically be methyl, ethyl, n-propyl, iso-propyl, n-butyl, i-butyl, sec-butyl, amyl, octyl, decyl, octadecyl, etc. When R is aralkyl, it may typically be benzyl, beta-phenylethyl, etc. When R is cycloalkyl, it may typically be cyclohexyl, cycloheptyl, cyclooctyl, 2-methylcycloheptyl, 3-butylcyclohexyl, 3-methylcyclohexyl, etc. When R is aryl, it may typically be phenyl, naphthyl, etc. When R is alkaryl, it may typically be tolyl, xylyl, etc. R may be inertly substituted i.e. it may bear a non-reactive substituent such as alkyl, aryl, cycloalky, ether, etc. Typically inertly substituted R groups may include 2-ethoxyethyl, carboethoxymethyl, 4-methylcyclohexyl, etc. The preferred R groups may be lower alkyl, i.e. $C_1$-$C_{10}$ alkyl, groups including e.g. methyl, ethyl, n-propyl, i-propyl, butyls, amyls, hexyls, octyls, decyls, etc. R may preferably be isopropyl or sec-butyl.

The preferred aluminum alkoxides are those lower aluminum alkoxides wherein all the R groups are the same. Most preferred are aluminum tri-sec-butoxide and aluminum tri-isopropoxide. It is preferred to utilize the lower alkoxides because they are generally liquids at temperature of operation and for economic reasons (i.e. they contain a larger relative content of aluminum). Aluminum alkoxides are readily available commercially from various suppliers including Aldrich, Fisher, or Johnson Matthey.

In practice of the process of this invention, the charge e.g. $Al(OR)_3$ (referred to as an alkoxide, for convenience) is employed in liquid state. In the case of the higher alkoxides (typified by $Al(OR)_3$ wherein R is octadecyl) which are solid at operating temperature, they may be employed in admixture with an alcohol, preferably ROH i.e. wherein the R group is lower $C_1$-$C_5$ alkyl.

To the charge alkoxide (100 parts) at temperature of 100° C.-275° C., say 145° C., there is added 100-500, preferably 200 parts of liquid alcohol typically a lower $C_1$-$C_5$ alkanol such as isopropanol, and 0.5-7 parts, say 1 part of acid peptizing agent. Typical acid peptizing agents may include nitric acid, oxalic acid, or sulfuric acid. The preferred acid peptizing agent may be nitric acid.

The charge alkoxide liquid, containing peptizing agent, is hydrolyzed by contact with steam at 100° C.-275° C., say 156° C. and 1-150 psig, say 29 psig. During reaction over 0.5-30 minutes, say 20 minutes, the aluminum alkoxide is decomposed by the steam to yield alcohol and alkoxide in which some of the alkoxide groups have been replaced by —OH groups:

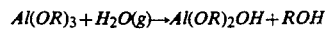

This reaction typically proceeds further to yield hydrolyzed polymer product

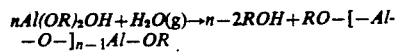

wherein n may be 100-10,000,000 say 10,000.

The hydrolyzed product of the reaction may be considered a stabilized/peptized colloidal sol of alumina in admixture with the alcohol originally present plus that formed during reaction. The alumina may bear RO— groups on the chain or more likely in terminal position. The alumina in the sol may be characterized by x-ray diffraction and nitrogen porosimetry. The hydrolyzed alumina sol contains gamma alumina with a Pore Mode of typically 4-45 Å, preferably 7-15 Å, say 13.6 Å and a BET surface area of typically 150-400 m$^2$/g, typically 160-310 m$^2$/g, say 175 m$^2$/g. Preferably >70% of the Pores are <14 Å.

Preparation of an alumina membrane assembly from the stabilized sol may be effected by various techniques. If it be desired to coat e.g. the inside of a tubular or cylindrical microporous support bearing blocking liquid, the sol in liquid phase may be steam sprayed through the tubular or cylindrical support to form thereon a membrane of alumina over 1-10, say 1.9 minutes at 50° C.-200° C., say 156° C. In another embodiment, the sol may be steam treated during preparation prior to deposition e.g. on the inside of the tube of alumina.

In still another embodiment, the sol may be deposited on the support and thereon contacted with steam at desired temperature and pressure. In another embodiment, the sol (containing water) may be deposited and steam treatment may be effected by reducing the pressure to generate steam in situ. In another embodiment the stabilized sol liquid may be poured as a thin layer on a flat surface. Excess liquid may be removed by drying at 20° C.-100° C., say about 25° C. for 20-60, say about 25 minutes followed by calcining at 400° C.-600° C., say 400° C. for 24-48 hours, say 34 hours.

Supported alumina membranes may be formed by coating a thin microporous support (formed typically of alpha alumina, carbon, porous glass, etc.) with the sol to attain a thin film on the surface thereof. This film-membrane may be dried at 20° C.-100° C., say about 25° C. for 20-60 minutes, say about 25 minutes, and then calcined at 400° C.-600° C., say 400° C. for 24-48 hours, say 34 hours.

The porous ceramic support layer bearing (i) outer layers of macropores loaded with adsorbed blocking liquid and (ii) a surface layer of alkoxide sol is subjected to a controlled drying at about 20° C.-100° C., preferably 20° C.-40° C., say about 25° C. at 1-130 psig, say 10 psig for 20-60 minutes, say about 25 minutes. During this controlled drying, the adsorbed blocking liquid migrates outwardly toward the surface of the porous ceramic support as the liquid evaporates. Simultaneously the liquid in the alkoxide sol layer migrates into the ceramic support layer—but the movement of the outwardly migrating blocking liquid toward the surface prevents substantial migration of the alkoxide sol from migrating too great a distance. Accordingly the drying alkoxide sol dries as a surface layer of depth of 8-200, say 30 microns.

At the end of the controlled drying period, the porous ceramic support contains a minimum of residual blocking liquid and it bears a surface layer of dried alkoxide sol.

The so-dried porous ceramic carrier layer, bearing a surface layer of dried alkoxide sol is heated at a rate of 5°-30° C./hr, say 10° C. per hour to calcining temperature and then is calcined at calcining temperature of 300° C.-500° C., preferably 400° C. for 24-48 hours, say 34 hours.

During calcining, the dried alumina sol is decomposed to form a thin porous layer of alumina. Typically this layer is of thickness of 8-200, say 30 microns.

When desired, the deposition process may be repeated one or more additional times to obtain membranes of increasing thickness.

The membranes prepared by the process of this invention are typically characterized (by a high surface area and a narrow Pore Size Distribution) as follows:

TABLE

| Property | Broad | Narrow | Preferred |
|---|---|---|---|
| Surface Area by | | | |
| Cumulative Desorption m$^2$/g | 4-300 | 100-250 | 225 |
| Multi-point BET m$^2$/g | 150-30 | 140-275 | 162 |
| Pore Volume cc/g for: | | | |
| Pores < 1857.2 Å at P/Po = 0.005 | 2.8-70 | 16-25 | 24 |
| Cumulative Desorption 2000 Å-12.5 Å radius | 20-1500 | 80-1000 | 250 |
| Pore Mode | 8-1200 | 130-860 | 329 |
| Porosity % | 40-52 | 45-51 | 48.5 |

Preferably at least about 70% of the Pores have a Pore Radius of <1000 Å.

The membrane system so prepared may be used to separate liquids typified by methanol-water (Separation Factor of 4-7, say 5.1) or ethanol-water (Separation Factor of 7.2-9.5, say 8.1) or isopropanol-water (Separation Factor of 9-12, say 10.8).

The so-prepared porous ceramic carrier layer characterized by mechanical strength and bearing the intermediate porous support layer may be further treated to form thereon a non-porous separating layer which may be used to separate mixtures of fluids.

In accordance with certain of its preferred aspects, this invention is directed to a method of separating a charge gas mixture containing a more permeable gas and a less permeable gas which comprises passing a charge gas mixture containing a more permeable gas and a less permeable gas into contact with a membrane of a high purity alumina containing aluminum-oxygen repeating units;

maintaining a pressure on the charge side of said membrane greater than the pressure on the permeate side of said membrane thereby yielding a permeate containing increased quantity of said more permeable gas and decreased quantity of said less permeable gas and a retentate containing decreased quantity of said more permeable gas and an increased quantity of said less permeable gas;

recovering said permeate containing increased quantity of said more permeable gas and decreased quantity of said less permeable gas; and recovering said retentate containing decreased quantity of said more permeable gas and an increased quantity of said less permeable gas.

The separations membranes prepared by the process of this invention, whether on a supporting membrane or other structure, are particularly characterized by their ability to separate charge gas streams into their several components. For example, it is possible to treat gas streams containing various combinations of gases such as hydrogen, nitrogen, carbon monoxide, carbon dioxide, ammonia, hydrogen sulfide, hydrocarbons, inert gases, etc. to yield a product which is desirably enriched (or depleted) in one of the components. Typical charge systems which may be treated include hydrogen/carbon dioxide, hydrogen/nitrogen, nitrogen/carbon dioxide, etc. It is preferred that the charge stream be dry i.e. that it contain less than about 100 ppm of water and that it be free of strongly acid gases such as hydrogen chloride i.e. less than about 1 ppm.

Separation of the charge gas may be effected by passing the charge gas at 10° C.-500° C., say 170° C. and 1-600 psig, say 25 psig into contact with the membrane at a flow rate of 15-110 moles/sec, say 75 moles/sec.

During typical operation, charge containing say hydrogen (40 v%) and carbon dioxide (69 v%) may yield permeate containing 97 v% hydrogen and 3 v% carbon dioxide at a Flux of 270-1900, say 978 moles/cm$^2$ sec, and a Separation Factor of 5-10 say about 5.6. Satisfactory commercial operation typically is attained with a Separation Factor of 4.9.

ADVANTAGES OF THE INVENTION

Among the advantages and characteristics of this invention may be noted the following:

1. It permits preparation and application of a charge sol in a matter of minutes.
2. The formed membrane can be used at high or low temperature with little or no evidence of cracking or other deterioration.
3. Charge mixtures can readily be separated at high Flux and Selectivity.
4. The membrane is characterized by a highly homogeneous structure which is particularly able to be formed at a fast rate and which therefore permits deposition on multichannel or honeycomb structures.

DESCRIPTION OF PREFERRED EMBODIMENTS

Practice of the process of this invention may be apparent to those skilled in the art from the following wherein all parts are parts by weight unless otherwise indicated. An asterisk indicates a control example.

EXAMPLE I

In this Example which sets forth the best mode presently known of carrying out the process of this invention, the substrate on the inside of which the alumina is to be deposited is a porous ceramic tube of alpha alumina of 10 mm outside diameter, 1.5 mm thickness, and 750 mm length (as manufactured by Alcoa under the trademark Membralox).

The inside of this tube is filled with an aqueous solution containing 20 w% ethanol and 80 w% water at 62° C. and 10 psig. As this solution contacts the alumina tube over 2 hours, the aqueous solution of blocking liquid diffuses into and is adsorbed in the pores of the support.

The remainder of the blocking liquid is poured off, after 2 hours, and the excess is removed from the interior of the tube by blowing air at about 26° C. and 10 psig through the tube for about 25 minutes to yield a superficially dry surface.

The alkoxide sol which is employed in this embodiment is prepared by mixing 100 parts of aluminum triisopropoxide and 200 parts of isopropanol with 1 part of nitric acid peptizer. Hydrolysis is effected by passing steam (156° C./29 psig) through the mixture at a rate of 300 cc/sec for 20 minutes.

The hydrolyzed stabilized sol is passed into contact with the inside of the tube in a dipping procedure wherein it is maintained for 1.9 minutes at 156° C. The liquid is gently poured off and the tube is dried by passing air at 24° C. and 10 psig through the tube for 15 minutes.

The dried supported membrane is heated (Ca 10° C./hr) to 400° C. at which temperature it is maintained for 34 hours. It is then cooled (Ca 10° C./hr) to ambient temperature.

The product membrane (8 microns thick) is characterized as follows:

TABLE

| Property | Value |
|---|---|
| Thickness (microns) | 8 |
| Porosity % | 48.5 |
| Surface $m^2/g$ (BET) | 162.5 |
| Pore Mode Å Diameter | 329 |

There is then admitted to the interior of the tube of 125° C. and 15 psig, charge gas containing 46 v% hydrogen and 54 v% carbon dioxide. After 1.2 hours operation, it is found that a permeate gas is recovered containing 94 v% hydrogen and 6 v% carbon dioxide.

EXAMPLE II-V

Results comparable to those attained in Example I may be attained if the charge gas is:

TABLE

| Example | Charge Gas | Separation Factor at Charge Pressure of 10 Psig |
|---|---|---|
| II | $H_2/CO_2$ | 5.3 |
| III | $H_2/N_2$ | 3.2 |
| IV | $H_2/He$ | 4.4 |
| V | $N_2/CO_2$ | 1.9 |

EXAMPLES VI-X

In this series of runs, the procedure of Example I is followed except that the charge is pure carbon dioxide at 5 psig.

TABLE

| Example | Number of Dips | Deposited Thickness Microns | Initial Permeate Rate Moles/$cm^2$/min |
|---|---|---|---|
| VI | 0 | 0 | 0.78 |
| VII | 1 | 11.2 | 0.61 |
| VIII | 2 | 17 | 0.58 |
| IX | 3 | 22 | 0.54 |
| X | 4 | 31 | 0.51 |

From the above Table, it will be seen that it is possible to attain satisfactory permeate rate by use of only one dip.

EXAMPLES XI-XV

In this series of runs, the membrane preparation procedure of Example I is carried out except that the dipping procedure is repeated a number of times to yield thicker layers of alumina. Each dip increases the thickness of the alumina layer by about 8 microns. The Initial Permeate Rate ($\times 10^4$ in $moles/cm$·sec) is measured as a function of the Number of Dips i.e. deposit thickness (microns) with a charge of pore hydrogen at 5 psig.

TABLE

| Example | Number of Dips | Deposited Thickness | Initial Permeate Rate |
|---|---|---|---|
| XI | 0 | 0 | 1.2 |
| XII | 1 | 8 | 1.1 |
| XIII | 2 | 16 | 1.0 |
| XIV | 3 | 24 | 0.95 |
| XV | 4 | 32 | 0.9 |

EXAMPLES XVI-XX

Results comparable to those attained in Example I may be attained if the blocking liquid is:

TABLE

| Example | Blocking Liquid |
|---|---|
| XVI | 25 w % methanol |
| | 10 w % acetone |
| | 65 w % water |
| XVII | 40 w % propanol |
| | 8 w % acetic acid |
| | 32 w % water |
| | 20 w % ethanol |
| XVIII | 15 w % propionic acid |
| | 20 w % water |
| | 65 w % isopropanol |
| XIX | 70 w % ethanol |
| | 10 w % propionic acid |
| | 20 w % diethyl ketone |
| XX | 40 w % diethyl ketone |
| | 20 w % water |
| | 40 w % acetic acid |

EXAMPLES XXI-XXIII

The membrane system of Example I may be employed to separate the following gas mixtures:

TABLE

| Example | Charge Gas Mixture | Permeate is enriched with respect to |
|---|---|---|
| XXI | $H_2/N_2$ | $H_2$ |
| XXII | $N_2/CO_2$ | $N_2$ |
| XXIII | $H_2/He$ | $H_2$ |

Although this invention has been illustrated by reference to specific embodiments, it will be apparent to those skilled in the art that various changes and modifications may be made which clearly fall within the scope of the invention.

What is claimed:

1. A method of separating a charge gas mixture containing a more permeable gas and less permeable gas which comprises
    passing a charge gas mixture containing a more permeable gas and a less permeable gas into contact with a membrane of a high purity alumina containing aluminum-oxygen repeating units and characterized by a thickness of 8-200 microns and a narrow pore size distribution wherein at least about 70% of the pores have a Pore Radius of less than about 1000 Å;

maintaining a pressure on the charge side of said membrane greater than the pressure on the permeate side of said membrane thereby yielding a permeate containing increased quantity of said more permeable gas and decreased quantity of said less permeable gas and a retentate containing decreased quantity of said more permeable gas and an increased quantity of said less permeable gas;

recovering said permeate containing increased quantity of said more permeable gas and decreased quantity of said less permeable gas; and recovering said retentate containing decreased quantity of said more permeable and an increased quantity of said less permeable gas.

2. A membrane assembly comprising
(i) a porous ceramic support bearing
(ii) a membrane comprising high purity alumina containing aluminum-oxygen repeating units and bearing alkoxide groups and characterized by a thickness of 8–200 microns and a narrow pore size distribution wherein at least about 70% of the pores have a Pore Radius of less than about 1000 Å.

3. A membrane assembly comprising a porous ceramic support bearing a membrane surface layer of dried alumina of thickness of 8–200 microns prepared by the process which comprises loading the outer layers of macropore of a porous ceramic carrier with blocking liquid thereby forming a porous ceramic support layer bearing outer layers of macropores loaded with adsorbed blocking liquid;

contacting said outer layers of macropores of said porous ceramic carrier layer loaded with adsorbed blocking liquid with an aluminum alkoxide sol;

maintaining said outer layers of macropores of said porous carrier layer loaded with adsorbed blocking liquid in contact with said aluminum alkoxide sol for an adsorption period during which said alkoxide sol is adsorbed as a surface layer on the surface of said porous carrier layer;

drying said porous support layer bearing (i) outer layers of macropores loaded with adsorbed blocking liquid and (ii) a surface layer of said alkoxide sol during a controlled drying period at 20° C.–100° C. during which said adsorbed blocking liquid migrates outwardly toward the surface of said porous ceramic carrier layer during drying and minimizes migration of said alkoxide sol into said porous ceramic carrier layer as drying continues thereby forming a dried porous ceramic carrier layer bearing a surface layer of dried alkoxide sol;

calcining said porous ceramic carrier layer bearing said surface layer of dried alkoxide sol at a calcining temperature of 400° C.–500° C. thereby decomposing said alkoxide and forming a porous carrier layer bearing a surface layer of decomposed alkoxide sol; and recovering said porous ceramic carrier layer bearing a surface layer of decomposed alkoxide sol.

4. The method of preparing a membrane assembly containing (i) a porous ceramic carrier layer characterized by mechanical strength and (ii) a porous surface layer which comprises loading the outer layers of macropores of a porous ceramic carrier with blocking liquid thereby forming a porous ceramic support layer bearing outer layers of macropores loaded with adsorbed blocking liquid;

contacting said outer layers of macropores of said porous ceramic carrier layer, with adsorbed blocking liquid with an aluminum alkoxide sol containing peptizing agent;

maintaining said outer layers of macropores of said porous carrier layer loaded with adsorbed blocking liquid in contact with said aluminum alkoxide sol for an adsorption period during which said alkoxide sol is adsorbed as a surface layer on the surface of said porous carrier layer;

drying said porous support layer bearing (i) outer layers of macropores loaded with adsorbed blocking liquid and (ii) a surface layer of said alkoxide sol during a controlled drying period during which said adsorbed blocking liquid migrates outwardly toward the surface of said porous ceramic carrier layer during drying and minimizes migration of said alkoxide sol into said porous ceramic carrier layer as drying continues thereby forming a dried porous ceramic carrier layer bearing a surface layer of dried alkoxide sol;

calcining said porous ceramic carrier layer bearing said surface layer of dried alkoxide sol at a calcining temperature of 400° C.–500° C. thereby decomposing said alkoxide and forming a porous carrier layer bearing a surface layer of decomposed alkoxide sol; and recovering said porous ceramic carrier layer bearing a surface layer of decomposed alkoxide sol.

5. The method of preparing a membrane assembly as claimed in claim 4 wherein said aluminum alkoxide is characterized by the formula $Al(OR)_3$ wherein R is alkyl, alkaryl, aralkyl, cycloalkyl, or aryl.

6. The method of preparing a membrane assembly as claimed in claim 4 wherein said aluminum alkoxide is a lower alkoxide.

7. The method of preparing a membrane assembly as claimed in claim 4 wherein said aluminum alkoxide is aluminum tri-isopropoxide.

8. The method of preparing a membrane assembly as claimed in claim 4 wherein said aluminum alkoxide is aluminum tri sec-butoxide.

9. The method of preparing a membrane assembly as claimed in claim 4 wherein said peptizing agent is nitric acid, oxalic acid, oxalic acid, acetic acid, or sulfuric acid.

10. The method of preparing a membrane assembly as claimed in claim 6 wherein said peptizing agent is nitric acid.

11. The method of preparing a membrane assembly as claimed in claim 4 wherein said porous ceramic carrier layer is an alumina support.

12. The method of preparing a membrane assembly containing (i) a porous ceramic carrier layer characterized by mechanical strength and (ii) a porous surface layer which comprises loading the outer layers of macropore of a porous ceramic carrier with ethanol blocking liquid thereby forming a porous ceramic support layer bearing outer layers of macropores loaded with adsorbed blocking liquid;

contacting said outer layers of macropores of said porous ceramic carrier layer loaded with said ethanol adsorbed blocking liquid with an aluminum tri-isopropoxide sol;

maintaining said outer layers of macropores of said porous carrier layer loaded with said ethanol adsorbed blocking liquid in contact with said aluminum tri-isopropoxide sol for an adsorption period during which said sol is adsorbed as a surface layer on the surface of said porous carrier layer;

drying said porous support layer bearing (i) outer layers of macropores loaded with said ethanol adsorbed blocking liquid and (ii) a surface layer of said aluminum tri-isoproxide sol during a controlled drying period at 20° C.-100° C. during which said adsorbed ethanol blocking liquid migrates outwardly toward the surface of said porous ceramic carrier layer during drying and minimizes migration of said aluminum tri-isopropoxide sol into said porous ceramic carrier layer as drying continues thereby forming a dried porous ceramic carrier layer bearing a surface layer of dried aluminum tri-isopropoxide sol;

calcining said porous ceramic carrier layer bearing said surface layer of dried aluminum tri-isopropoxide sol at a calcining temperature of 400° C.-500° C. thereby decomposing said aluminum tri-isopropoxide and forming a porous carrier layer bearing a surface layer of decomposed aluminum tri-isopropoxide sol; and recovering said porous ceramic carrier layer bearing a surface layer of decomposed aluminum tri-isopropoxide sol.

* * * * *